United States Patent
Baur et al.

(10) Patent No.: US 12,405,289 B2
(45) Date of Patent: *Sep. 2, 2025

(54) DEVICE AND METHOD FOR OPERATING A BENDING BEAM IN A CLOSED CONTROL LOOP

(71) Applicant: Carl Zeiss SMT GmbH, Oberkochen (DE)

(72) Inventors: Christof Baur, Darmstadt (DE); Florian Demski, Mühltal (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,453

(22) Filed: Mar. 26, 2024

(65) Prior Publication Data

US 2024/0230709 A1 Jul. 11, 2024

Related U.S. Application Data

(63) Continuation of application No. 18/128,690, filed on Mar. 30, 2023, now Pat. No. 11,965,910, which is a continuation of application No. 17/400,349, filed on Aug. 12, 2021, now Pat. No. 11,630,124.

(30) Foreign Application Priority Data

Aug. 13, 2020 (DE) .......................... 102020210290.2

(51) Int. Cl.
*G01Q 30/04* (2010.01)
*G01Q 10/06* (2010.01)

(52) U.S. Cl.
CPC ........... *G01Q 30/04* (2013.01); *G01Q 10/065* (2013.01)

(58) Field of Classification Search
CPC ............................. G01Q 30/04; G01Q 10/065

USPC ................ 850/10, 8, 9; 250/396 R
See application file for complete search history.

(56) References Cited

U.S. PATENT DOCUMENTS

| | | | |
|---|---|---|---|
| 7,190,858 B1 | 3/2007 | Greiner et al. | |
| 8,286,261 B2 | 10/2012 | Spizig et al. | |
| 8,459,102 B2 | 6/2013 | Bocek et al. | |
| 8,925,376 B2 | 1/2015 | Proksch et al. | |
| 11,630,124 B2 * | 4/2023 | Baur ...................... | G01Q 30/04 850/10 |

(Continued)

FOREIGN PATENT DOCUMENTS

EP 3 121 709 1/2017

OTHER PUBLICATIONS

"Bruker Introduces Fast BioAFM for Automated Mechanobiology," Bruker Corporation, Dec. 20, 2021.

(Continued)

*Primary Examiner* — Nicole M Ippolito
(74) *Attorney, Agent, or Firm* — Fish & Richardson P.C.

(57) ABSTRACT

The present invention relates to a device for operating at least one bending beam in at least one closed control loop, wherein the device has: (a) at least one first interface designed to receive at least one controlled variable of the at least one control loop; (b) at least one programmable logic circuit designed to process a control error of the at least one control loop using a bit depth greater than the bit depth of the controlled variable; and (c) at least one second interface designed to provide a manipulated variable of the at least one control loop.

17 Claims, 11 Drawing Sheets

(56) References Cited

U.S. PATENT DOCUMENTS

| | | | |
|---|---|---|---|
| 11,965,910 B2* | 4/2024 | Baur | G01Q 30/04 |
| 2008/0140343 A1 | 6/2008 | Roover et al. | |
| 2012/0207474 A1 | 8/2012 | Inoue et al. | |
| 2022/0082583 A1 | 3/2022 | Baur et al. | |
| 2023/0251285 A1 | 8/2023 | Baur et al. | |

OTHER PUBLICATIONS

"Bruker Launches Highest Resolution Large-Format Bio-AFM System," 9th AFM BioMed Conference, Bruker Corporation, Sep. 2, 2019.

"Bruker Launches New High-Speed AFM System for Life Science Microscopy Applications," Bruker Corporation, Jan. 29, 2019.

"NanoWizard® 4XP" Brochure of Bruker.

"PeakForce Tapping®" Brochure of Bruker.

"Vortis 2 SPMControl station", Bruker Corporation, retrieved from the web address "https://www.bruker.com/en/products-and-solutions/microscopes/bioafm/bioafm-accessories/vortis-2-spm-control-station.html" in 2023.

Barrettino, D., et al., "CMOS-Based Monolithic Controllers for Smart Sensors Comprising Micromembranes and Microcantilevers", *IEEE Transactions on Circuits and Systems—I: Regular Papers*, vol. 54, No. 1, pp. 141-152, (Jan. 2007).

German Office Action for German Application No. DE 10 2020 210 290.2, dated Mar. 26, 2021 (With English Translation).

Degen, C. L., et al., "Digital feedback controller for force microscope cantilevers," *Review of Scientific Instruments*, vol. 77, No. 043707, pp. 043707-1-043707-8 (2006).

* cited by examiner

Fig. 11

| In | Gain | Error | Accu. after 128 ticks | Accu. [23:8] after 128 ticks | Accu. after 256 ticks | Accu. [23:8] after 256 ticks |
|---|---|---|---|---|---|---|
| 1 | 1 | 1 | 128 | 0 | 256 | 1 |
| 2 | 1 | 2 | 256 | 1 | 512 | 2 |
| 3 | 1 | 3 | 384 | 1 | 768 | 3 |
| 32767 | 1 | 32767 | 4194176 | 16383 | 8388352 | 32767 |
| 1 | 255 | 255 | 32640 | 127 | 65280 | 255 |
| 255 | 255 | 65025 | 16646400 | 65025 | overflow | overflow |

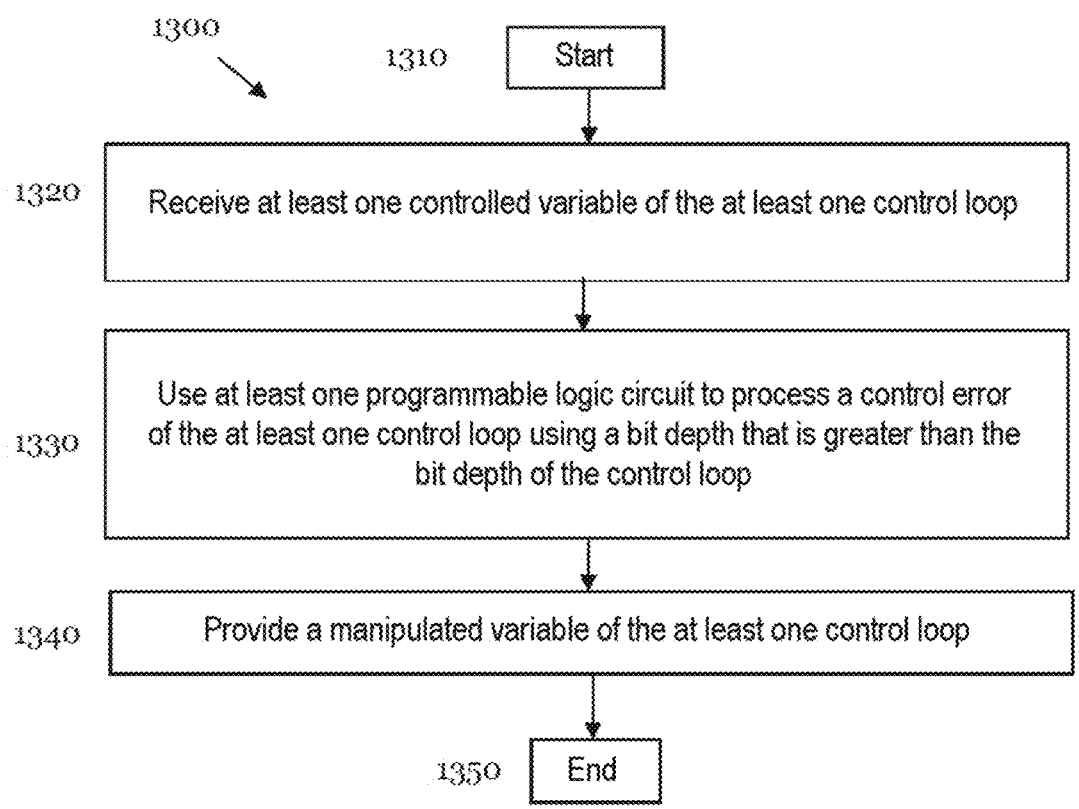

DEVICE AND METHOD FOR OPERATING A BENDING BEAM IN A CLOSED CONTROL LOOP

CROSS-REFERENCE TO RELATED APPLICATIONS

This application is a continuation of and claims priority under 35 U.S.C. § 120 to U.S. application Ser. No. 18/128,690, filed on Mar. 30, 2023, which is a continuation of U.S. application Ser. No. 17/400,349, filed on Aug. 12, 2021, now U.S. Pat. No. 11,630,124, which claims priority from German Application No. 10 2020 210 290.2, filed on Aug. 13, 2020. The entire contents of each of these priority applications are incorporated herein by reference.

TECHNICAL FIELD

The present invention relates to a device and a method for operating at least one bending beam in at least one closed control loop.

BACKGROUND

Scanning probe microscopes use a measuring probe to scan a sample or the surface thereof and thus yield measurement data for producing a representation of the topography of the sample surface. The spatial resolution of modern scanning probe microscopes is in the sub-nanometer range in the lateral direction and in the two-digit picometer range in the vertical direction. Scanning probe microscopes are abbreviated to SPM below. A distinction is drawn between different SPM types depending on the type of interaction between the measuring tip of a measuring probe and the sample surface.

In the microscope referred to as atomic force microscope (AFM) or scanning force microscope (SFM), a measuring tip of a measuring probe is deflected by atomic forces of the sample surface, typically attractive van der Waals forces and/or repulsive forces of the exchange interaction. The deflection of the measuring tip is proportional to the force acting between the measuring tip and the sample surface, and this force is used to determine the surface topography of the sample.

In addition to the AFM, there are a multiplicity of further apparatus types which are used for specific fields of application, such as e.g. scanning tunneling microscopes, magnetic force microscopes or optical and acoustic near-field scanning microscopes.

Scanning probe microscopes can be used in different operating modes. In a first contact mode, the measuring tip of a measuring probe is placed onto the sample surface and scanned over the sample surface in this state. Here, the deflection of a bending beam, a spring beam or a cantilever of the measuring probe, which carries the measuring tip, can be measured and used for imaging the sample surface. In a second contact mode, the deflection of the cantilever is kept constant in a closed control loop or feedback loop, and the distance of the SPM tracks the contour of the sample surface, in order to keep the deflection of the bending beam constant. In these two operating modes, firstly, the measuring tips of the measuring probes are subject to great wear as a result of the direct mechanical contact with the sample surface and, secondly, sensitive samples, for example biological material, can be damaged or even destroyed by the contact with the measuring tip.

In a third operating mode, the non-contact mode, the measuring tip is brought to a defined distance from the sample surface and the cantilever of the measuring probe is excited to oscillate, typically at or near the resonant frequency of the cantilever. The measuring probe, the oscillation of which is controlled by means of a closed control loop, is then scanned over the surface of the sample. Since the measuring tip does not come into contact with the sample in this operating mode, its wear is low. However, the spatial resolution of the SPM is lower in this operating mode than in the contact operating modes and, moreover, it is difficult to determine the surface contour on account of the short range of the forces acting between the sample surface and the measuring probe.

In a fourth operating mode, the intermittent mode (or tapping mode™), the bending beam or the cantilever of a measuring probe is likewise caused to carry out forced oscillation, but the distance between the SPM and the sample surface is chosen such that the measuring tip mounted on the bending beam reaches the sample surface only during a small part of an oscillation period. The contour of the surface of the sample is derived from the change in the frequency, the amplitude and/or the phase of the forced oscillation, which change is caused by the interaction of the measuring probe with the sample surface. The intermittent mode represents a compromise between the three aforementioned operating modes of a scanning probe microscope.

Besides the operating modes listed above, there are other options for scanning a sample surface using a measuring probe. By way of example, in the step-in operating mode, the lateral movement and the vertical movement of a measuring probe of the SPM are separated in time. In this operating mode, a surface of a sample can be scanned with high precision. The sequential lateral and vertical movement of the measuring probe means that a scanning process takes much longer in comparison with the operating modes outlined above, however.

It is of central importance for all operating modes that the measuring tip of the measuring probe does not unintentionally come into contact with the sample surface when the measuring probe approaches the sample surface to get ready for a scanning process for a sample. An uncontrolled interaction between the measuring probe and the sample surface can damage or even destroy a sample and/or the measuring probe. This also applies if the operating mode of a scanning probe microscope is changed while the measuring tip of the measuring probe is in the region of interaction with a sample. A brief loss of control of the movement of the bending beam or of the cantilever by the scanning probe microscope can arise while switching between two operating modes. An SPM therefore usually avoids switching the operating mode in the state in which the measuring probe has approached a sample surface.

Besides a measuring tip for examining a sample, a bending beam can also receive or have a micromanipulator or a nanomanipulator for processing a sample surface. Micromanipulators firstly need to approach the sample surface carefully; the approach process is therefore frequently performed using the intermittent operating mode. When the approach process has concluded, there is then a switch over to a contact operating mode, in which the micromanipulator is in contact with the sample surface in order to process the latter. As already explained above, a brief loss of control of the measuring probe by the SPM can arise when switching over between different operating modes, for example as a result of a closed control loop opening and/or switching transients or switching or voltage spikes arising.

Typically, contact operating modes of an SPM use soft bending beams or cantilevers, i.e. bending beams whose elastic constant is low. Soft bending beams cannot be used, or can be used only to a very restricted degree, for micromanipulators, however, since the forces that can be transmitted to the sample by soft bending beams are usually insufficient for processing the sample. However, the use of hard bending beams or cantilevers is associated with the difficulty that a loss of control while switching over the mode of operation when the micromanipulator has approached the sample surface means that the risk of damage to the sample and/or the micromanipulator is particularly high.

Furthermore, scanning probe microscopes cannot escape the general trend of moving the signal processing from the analogue to the digital domain to an ever greater degree. In the article "Digital feedback controller for force microscope cantilevers," Rev. of Scientific Instruments, 77, 043707-1 to 043707-8, doi: 10.1063/1.2183221, the authors C. L. Degen et al. describe a fast digital feedback controller that is based on a digital signal processor (DSP) and that is used for active oscillation damping in a cantilever of a magnetic resonance force microscope.

In the first step of the development towards digital control of a scanning probe microscope by use of one or more control or feedback loops, the signal demodulation, i.e. the amplitude or frequency demodulation, was still produced as an analogue circuit, while control of an SPM was undertaken by a digital signal processor (DSP). The signal demodulation, for example for operating a closed control loop, requires a signal processing speed that normally exceeds the capabilities of a DSP. Furthermore, the use of conventional digital circuits for the signal demodulation of SPMs has often not been possible to date on account of the huge number of logic gates or simply gates that is required for this task.

When modern field programmable gate arrays (FPGA) became available, the situation with regard to signal demodulation changed, but a digital circuit with a large number of gates was now available for the task of signal demodulation. The US patent specification U.S. Pat. No. 8,925,376 B2 describes a scanning force microscope in which an FPGA undertakes the signal generation and signal demodulation and a DSP is used to control the scanning force microscope. The US patent specification U.S. Pat. No. 8,459,102 B2 describes a digital system for adjusting a quality factor of a resonant system that is made up of a combination of an FPGA for signal generation and a DSP for adjusting the quality of a measuring probe of a scanning force microscope.

A scanning force microscope having multiple programmable digital circuits, for example a DSP and an FPGA, has a high level of complexity. Moreover, the data transmission necessary between the FPGA and the DSP adversely affects close synchronization and a deterministic time response, which are necessary in order to ensure interference- and transient-free control of the FPGA by the DSP at all times.

The US patent specification U.S. Pat. No. 8,286,261 B2 describes a pulsed-force operating mode of a scanning probe microscope in which the combination of an FPGA and a DSP is replaced by a powerful FPGA.

A DSP frequently uses floating-point arithmetic, whereas an FPGA typically uses fixed-point arithmetic. When changing from a combination solution comprising a DSP and an FPGA to a single-chip solution, i.e. a pure FPGA solution, the difficulty arises of realizing floating-point arithmetic logic units (FP-ALU) in fixed-point arithmetic. This difficulty typically involves dealing with a huge number of logic gates.

The present invention therefore addresses the problem of specifying a device and a method that can be used to at least partly avoid the difficulties in realizing digital control for a bending beam that have been outlined above.

SUMMARY

In accordance with one exemplary embodiment of the present invention, this problem is solved by a device according to claim 1 and by a method according to claim 16. In one embodiment, the device for operating at least one bending beam in at least one closed control loop has: (a) at least one first interface designed to receive at least one controlled variable of the at least one control loop; (b) at least one programmable logic circuit designed to process a control error of the at least one control loop using a bit depth that is greater than the bit depth of the controlled variable; and (c) at least one second interface designed to provide a manipulated variable of the at least one control loop.

The bit depth, the bit width or the resolution of a digital signal corresponds to the number of bits required for representing the integers in a range in a binary representation. By way of example, a bit depth of 8 bits allows the binary representation of the integers in the range from 0 to 255 or with arithmetic signs from −128 to +127.

The at least one controlled variable can indicate a position of the at least one bending beam. The manipulated variable can bring the at least one bending beam to a predefined position.

A control is defined in this application by the following variables: A reference variable $w(t)$ or a setpoint value describes for example a z-position of the bending beam or a deflection or bend of the bending beam as a function of time with reference to a reference position. The controlled variable $y(t)$ or the actual value in the example described indicates the measured z-position of the bending beam as a function of time. The control error $e(t)$ or the error variable is obtained from the difference between the reference variable or the setpoint value and the controlled variable or the actual value: $e(t)=w(t)-y(t)$. The manipulated variable $u(t)$ denotes the signal ascertained by a controller from the control error $e(t)$ in order to bring the actual value $y(t)$ into line with the setpoint value $w(t)$.

In a device according to the invention, the components of a programmable digital circuit can be designed such that neither the range of values for the control error $e(t)$ nor the parameters characterizing the control, or one of the internal digital signals for ascertaining the manipulated variable $u(t)$ for the at least one control loop of the programmable logic circuit, need to be restricted at some point in time in order to prevent a component of the programmable logic circuit from overflowing. Such a design of the programmable logic circuit is possible on account of the large number of logic gates that is available. Programmable logic circuits having several million logic units are available at present.

Owing to the availability of the full range of values of the control error $e(t)$ and the parameters of the control, the programmable logic circuit of a device according to the invention can also safely process small control errors $e(t)$ and error signals. This allows very precise control of the movement of a bending beam. At the same time, the sophistication for representing and processing the setpoint value and the actual value of the bending beam remains unchanged. Consequently, the design of a programmable digital circuit of a device according to the invention forms a best possible compromise between the accuracy with which the manipulated variable u(t) is produced, on the one hand, and, on the other hand, the bit depth and also the speed at which the setpoint values w(t) and actual values y(t) of the bending beam are scanned. Typically, digital signal processors having a bit depth of 8, 16 or 32 bits are employed. A programmable logic circuit implemented in a device according to the invention can also be used to realize other bit depths adapted for a specific application.

The manipulated variable of the at least one control loop can have a bit depth that corresponds to the bit depth of the controlled variable of the at least one control loop.

This means that the at least one first interface and the at least one second interface have the same bit depth.

The manipulated variable of the at least one control loop can have a bit depth that is greater than the bit depth of the controlled variable of the at least one control loop.

If this condition is satisfied, the programmable logic circuit of a device according to the invention provides the bending beam with a digital signal having a resolution or a bit depth that is greater than that for the signal received on the first interface for the controlled variable y(t). The bit depth of the manipulated variable can be the same as the bit depth used to process the control error, for example.

The manipulated variable of the at least one control loop can also have a bit depth that is greater than the bit depth of the manipulated variable of the at least one control loop.

The at least one first interface can comprise at least one analogue-to-digital converter (ADC). The ADC of the first interface converts the analogue signal of the fed-back controlled variable into a digital signal and provides said digital signal to the programmable logic circuit, as a result of which the latter is provided with the outlined controlled variable having a predefined bit depth. The bit depth of the controlled variable can be determined by the bit depth of the ADC. The bit depth that the programmable logic circuit uses to process a control error can be greater than the bit depth of the controlled variable.

The at least one second interface can comprise at least one digital-to-analogue converter (DAC). The DAC of the second interface converts the digital manipulated variable u(t) produced by the programmable logic circuit into an analogue signal for the manipulated variable that prompts the bending beam to move, for example prompts the bending beam to oscillate in the z-direction, i.e. at right angles to a sample surface.

The bit depth of the at least one analogue-to-digital converter (ADC) can correspond to the bit depth of the at least one digital-to-analogue converter (DAC). This configuration is currently preferred. However, a device according to the invention is not limited to such an arrangement.

The at least one programmable logic circuit can have a data reduction unit designed to bring the bit depth of the manipulated variable of the at least one control loop into line with the bit depth of the controlled variable of the control loop.

This means that the data reduction unit of the programmable logic circuit allows the digital signals of the first and the second interface to have a common bit depth.

The data reduction unit can be designed to reduce the bit depth of the at least one manipulated variable of the at least one control loop by omitting one least significant bit or by omitting multiple least significant bits.

The data reduction is carried out in a device according to the invention after calculating the manipulated variable from the control error, i.e. near the output of the programmable logic circuit and not right at the beginning of the calculation, in order to prevent a digital circuit component from overflowing uncontrolledly. This design of the programmable logic circuit of a device according to the invention has two advantages: Firstly, it allows calculation of the manipulated variable from the control error with the greatest possible precision, and, secondly, a possible data reduction is performed in a systematic manner.

A device according to the invention can further have at least one third interface designed to input at least one parameter for adjusting the at least one control loop.

The at least one third interface can have at least one analogue-to-digital converter (ADC). The bit depth of the ADC of the third interface can be adapted for the range of values or the bit depth of the at least one parameter. The third interface does not require an ADC if the at least one parameter of the programmable logic circuit is already provided in digital form. This is typically the case.

The at least one parameter can have a bit depth that is less than or equal to the bit depth of the controlled variable of the at least one control loop.

A multiplication of the at least one parameter by the control error of the at least one control loop can determine the bit depth of a data input into the data reduction unit. A multiplication of the at least one parameter by the control error of the at least one control loop can determine the bit depth of the manipulated variable of the at least one control loop.

As already explained above, the device according to the invention permits neither the control error nor the one or more parameters stipulating the adjustment of the control of the bending beam to have their ranges of values restricted. A possible data reduction for the manipulated variable u(t) is carried out only after said manipulated variable has been calculated.

The at least one parameter can comprise a parameter of a controller for controlling the at least one control loop.

The controller can comprise a PID controller. The abbreviation PID stands for a proportional, an integral and a derivative component of the controller. Proportional, integral and derivative components are also referred to as proportional, integral and derivative terms. The controller can comprise a parallel structure of a proportional, integral and/or derivative component. Preferably, the controller comprises a PI controller. Furthermore, it is beneficial if the I component of the PI controller determines the control response thereof.

The at least one parameter can comprise at least one element from the group comprising: a gain of the controller, a reset time of the controller and a derivative-action time of the controller.

The at least one programmable logic circuit can be designed to manipulate the at least one parameter with the control error without previously performing a data reduction.

The device according to the invention can further have at least one fourth interface designed to input a reference variable for the at least one control loop.

The reference variable can have a bit depth that corresponds to the bit depth of the controlled variable. The at least one fourth interface can have an analogue-to-digital converter (ADC). However, it is also possible for the reference variable w(t) or the setpoint variable to have a bit depth that is greater than or less than the bit depth of the controlled variable y(t).

The first interface can comprise an analogue-to-digital converter and the second interface can comprise a digitalto-analogue converter, and a sampling rate of the analogue-to-digital converter can be greater than a conversion rate of the digital-to-analogue converter.

The sampling rate can be a factor of 4, preferably a factor of 16, more preferably a factor of 64 and most preferably a factor of 256 greater than the conversion rate.

The conversion rate of a digital-to-analogue converter is also referred to as the resolution thereof, i.e. the width of the levels or else the number of levels or the number of digits per unit time.

The programmable logic circuit can be designed to operate the at least one bending beam in at least two of the following operating modes: a contact mode, a non-contact mode, an intermittent mode and a step-in mode.

Since a device according to the invention can operate a bending beam in different operating modes, it is suitable for use in a scanning probe microscope that examines a sample and/or a sample surface by scanning it. Furthermore, a device according to the invention can likewise be used to process a sample by virtue of a stiff bending beam moving a micromanipulator or a nanomanipulator in a controlled manner in relation to a sample. On top of that, a device according to the invention can be used to process a sample for example by mechanically removing material.

The programmable logic circuit can be designed to switch over between at least two of the operating modes of the bending beam without losing control over a position of the bending beam. The position can comprise a vertical position of the bending beam relative to a reference position or to a sample surface.

This aspect of the device defined above allows different operating modes of a measuring probe and/or a micromanipulator of a scanning probe microscope to be switched over in a transient- and/or voltage-spike-free manner. This aspect can be implemented in a device according to the invention, regardless of whether or not said device realizes feature b.

Interruption-free control of the bending beam means that a device according to the invention ensures that there is no damage to the bending beam or to a measuring tip or a micromanipulator attached to the bending beam and/or damage to or even destruction of a sensitive sample during a switchover process for the operating mode of the bending beam. This in particular also applies if the bending beam is in the region of interaction with the sample during the switchover.

The programmable logic circuit can be designed to set the manipulated variable of the at least one control loop to a predefined value before switching over the operating mode of the bending beam. Preferably, the predefined value of the manipulated variable brings about no deflection of the bending beam. This means that the manipulated variable freezes the state of the bending beam.

Stopping oscillation of the bending beam before the operating mode thereof is switched over prevents one of the possible causes of a brief uncontrolled state of the bending beam during the switchover phase. At the same time as the oscillation of the bending beam is switched off, the control is brought to a hold mode, i.e. the state of said control is frozen. If the controller were not put into a hold mode, the detected enormous control error would cause the controller to attempt to correct the control error by changing the manipulated variable.

The programmable logic circuit can be designed to start a proportional component of the control of the at least one control loop from a value of zero after switching over an operating mode.

Starting the P component of the control from a tiny portion after switching over the operating mode of the bending beam prevents a sudden change in the manipulated variable from allowing the bending beam to unintentionally come into contact with the sample as a reaction to the disruptive change.

The programmable logic circuit can be designed to move the bending beam towards a sample surface and/or away from the sample surface over a predefined distance at a predefined speed. The bending beam can be moved either with or without superimposed oscillation of the bending beam. Preferably, the bending beam is moved in the z-direction without oscillation thereof. In this state, the position of the bending beam relative to the sample surface can be controlled more easily.

The programmable logic circuit can be designed to start a proportional component of the control of the at least one control loop from a value of zero in any operating mode of the bending beam. This measure makes it possible to ensure that the control loop controls the movement of the bending beam predefined by the setpoint value, i.e. the feedback loop can be closed, at the earliest possible time. Undesirable uncontrollable transient movements of the bending beam can thus be reliably prevented.

The programmable logic circuit can be designed to reduce the proportional component of the control to zero before switching over the operating mode of the bending beam. This makes it possible to prevent the control implemented by the programmable logic circuit from producing one or more switching transients and/or one or more voltage spikes that cause an undesirable uncontrollable movement of the bending beam as a result of a change of operating mode.

The programmable logic circuit can be designed to stop a lateral scan of the bending beam before changing over the operating mode. This is another precautionary measure to prevent a change of operating mode of the bending beam from being able to damage said bending beam and/or the sample.

The controlled variable can have a bit depth of 16 bits, the at least one parameter can have a bit depth of 8 bits and the programmable logic circuit can process the control error using a bit depth of 32 bits. Further, the controlled variable can have a bit depth of 16 bits, the at least one parameter can have a bit depth of 8 bits and the programmable logic circuit can process the control error using a bit depth of 24 bits. The data reduction unit of the programmable logic circuit can limit the bit depth of the controlled variable to 16 bits.

The programmable logic circuit can comprise at least one element from the group comprising: a programmable logic array (PLA), a complex programmable logic device (CPLD) and a field programmable gate array (FPGA).

The at least one bending beam can comprise an element from the group comprising: a cantilever having a measuring tip of a scanning probe microscope, a probe arrangement for a scanning probe microscope having at least two probes that have different measuring tips for examining and/or processing a sample, and at least one micromanipulator for processing a sample. Processing the sample can comprise removing a particle from a surface of a sample. Further, processing a sample using a micromanipulator can comprise mechanically abrading material of the sample. The micromanipulator can interact with a particle by use of electrostatic interaction. The micromanipulator can have a tip that interacts with a particle by electrostatic interaction.

The bending beam can comprise silicon (Si) and/or silicon nitride ($Si_3N_4$). The bending beam can have any form. In particular, the bending beam can comprise a V-shaped cantilever. Moreover, a bending beam can be clamped on two sides and the measuring tip can be excited to oscillate in the middle between the two clamping regions. The bending beam clamped on two sides can be excited to oscillate by one clamped or by both clamped regions.

The length of the bending beam can cover a range from 1 µm to 3000 µm, preferably 10 µm to 1000 µm, more preferably 50 µm to 500 µm and most preferably 100 µm to 300 µm. The width of the bending beam can cover a range from 0.5 µm to 1000 µm, preferably 2 µm to 300 µm, more preferably 5 µm to 100 µm and most preferably 10 µm to 60 µm. The thickness of the bending beam can cover a range from 0.1 µm to 20 µm, preferably 0.3 µm to 10 µm, more preferably 0.6 µm to 5 µm and most preferably 1 µm to 3 µm.

An elastic constant of the bending beam can cover a range from 0.1 N/m to 10 000 N/m, preferably 1 N/m to 2000 N/m, more preferably 10 N/m to 700 N/m and most preferably 30 N/m to 200 N/m.

The tip of the micromanipulator can comprise a carbon tip. The carbon tip can comprise a carbon nanotube.

The device can be designed to operate the bending beam in the z-direction in a control loop. The z-direction can be the direction of a sample normal. Further, the device can be designed to produce a movement of the bending beam in a first and/or in a second lateral direction in a first and/or a second control loop. The first and/or the second lateral direction can be directions along the sample surface. It is also possible to operate the bending beam in the z-direction in a closed control loop and to control a movement of the bending beam in a first and/or in a second lateral direction.

The controlled variable can comprise a change in a force acting on the bending beam. Further, the controlled variable can comprise a change in a deflection of the bending beam.

The device can be designed to examine a lithographic mask by scanning it with a bending beam that is operated in a closed control loop. The bending beam can comprise a tip or a measuring tip that allows the bending beam to interact with a sample. The measuring tip can be mounted on the free end of the bending beam. The lithographic mask can comprise an element from the group comprising: a transmissive mask, a reflective mask and a stamp for a nanoimprint lithography.

The device can contain a machine learning model that has been trained to adjust the at least one parameter of a control.

Moreover, the device can contain a machine learning model that has been trained to provide a reference variable of at least one control loop to the at least one programmable logic circuit. This allows an auto-tuning of the control parameter(s) of the controller.

A scanning probe microscope can comprise at least one device according to one of the aspects described above.

In one embodiment, the method for operating at least one bending beam in at least one closed control loop has the steps of: (a) receiving at least one controlled variable of the at least one control loop; (b) processing a control error of the at least one control loop using a bit depth that is greater than the bit depth of the controlled variable; and (c) providing a manipulated variable of the at least one control loop.

A computer program can comprise instructions that prompt a computer system to perform the steps of the method described above when the computer program is executed by the computer system.

BRIEF DESCRIPTION OF DRAWINGS

The following detailed description describes currently preferred exemplary embodiments of the invention with reference to the drawings, in which

FIG. 11 uses a table to summarize simulation results for the I controller presented in FIG. 8;

FIG. 13 presents a flowchart for a method for operating at least one bending beam in at least one closed control loop.

DETAILED DESCRIPTION

The text below provides a more accurate explanation of currently preferred embodiments of a device according to the invention and a method according to the invention using the example of operating a closed control or feedback loop of a bending beam of a scanning force microscope. These can be employed for all types of scanning probe microscopes that have a bending beam or a cantilever, however. Furthermore, exemplary embodiments of a device according to the invention and of a method according to the invention are explained in detail below with reference to examining and/or processing a lithographic mask. However, the device according to the invention and the method according to the invention are not limited to these examples. Rather, they can be used for examining and/or processing any samples using a measuring probe and/or a micromanipulator in a closed control loop.

The concept of the present application, namely processing an error signal using a greater resolution or bit depth than the digitized measurement signals on the basis of which the error signal was determined, is not limited to the operation of bending beams or cantilevers in closed control loops. Rather, this concept can be used generally for precisely controlling or regulating measurement processes and/or machining processes.

Figure 1:
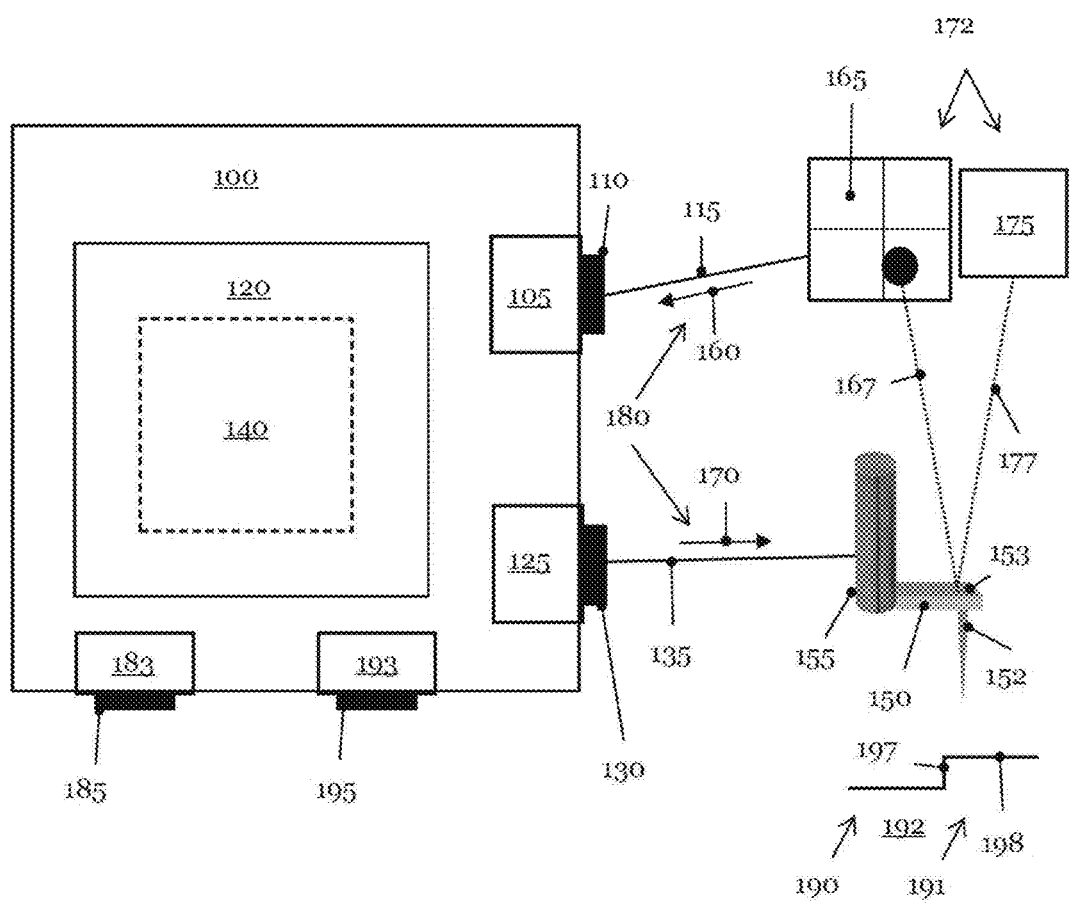
FIG. 1 illustrates a schematic section through a device according to the invention having a control loop for controlling a bending beam.

FIG. 1 schematically shows a schematic section through a device 100 containing a programmable logic circuit 120. The programmable logic circuit (PLD, Programmable Logic Device) 120 can comprise a programmable logic array (PLA), a complex programmable logic device (CPLD) and/or a field programmable gate array (FPGA). The PLD 120 can be mask programmable, one time programmable (OTP), EPROM (Erasable Programmable Read Only Memory) programmable, EEPROM (Electrically Erasable Programmable Read Only Memory) or flash programmable and/or SRAM (Static Random Access Memory) programmable. In the example reproduced in FIG. 1, the programmable logic circuit 120 realizes a controller 140. The illustrative controller 140 in FIG. 1 is preferably implemented as a PI controller, P denoting the proportional and I denoting the integral component of the controller 140.

The device 100 comprises a first interface 110. The first interface 110 is connected to a four-quadrant detector 165 of an optical detection system 172 by use of the connection 115 in the example depicted in FIG. 1. The optical detection system 172 detects the position of the bending beam 150. In detail, the optical detection system 172 determines the position of the free end 153 of the bending beam 150 or of the cantilever 150 in relation to a reference position. Typically, the position of the free end 153 of the bending beam 150 with reference to a surface of a sample 190 is ascertained. To determine the position, the four-quadrant detector 165 or another position-sensitive detector (not shown in FIG. 1) of the optical detection system 172 measures a curvature, bend or deflection of the free end 153 of the cantilever 150.

For this purpose, a light source 175, which preferably comprises an LED (Light Emitting Diode) or a laser system, emits a beam of light 177 onto the free end 153 of the bending beam 150. The beam of light 167 reflected by the top of the bending beam is detected by the four-quadrant detector 165 of the optical detection system 172. In the example illustrated in FIG. 1, the four-quadrant detector 165 determines the z-position of the bending beam 150. The four-quadrant detector 165 provides the measured z-position of the bending beam 150 to the device 100 via the first interface 110 as controlled variable $y_A(t)$ 160.

The first interface 110 of the device 100 can contain an analogue-to-digital converter (ADC) 105. The ADC 105 converts the analogue measurement signal of the four-quadrant detector 165 into a digital signal. Important parameters of the ADC 105 are its bit depth and its maximum sampling rate. These parameters dominate the quantization errors in the AD conversion of the controlled variable 160 measured by the optical detection system 172.

The device 100 comprises a second interface 130. The programmable logic circuit 120 uses this interface 130 to provide the manipulated variable 170 ascertained for the control of the z-position of the bending beam 150 to the bending beam 150 via the connection 135. The second interface 130 can contain a digital-to-analogue converter (DAC) 125. The DAC 125 converts the digital signal generated by the PLD 120 into an analogue manipulated variable 170. Preferably, the DAC 125 has the same or a similar bit depth and sampling rate as or to the ADC 105. However, it is also possible for both the sampling rate and the bit depth of the ADC 105 and the DAC 125 to be significantly different.

The bending beam 150 or the cantilever 150 is attached to a piezo element 155. The piezo element can alter the z-position of the bending beam 150. The piezo element 155 can move the bending beam 150 in a defined form at right angles to the sample surface. In particular, the piezo element 155 can cause the bending beam 150 or the free end 153 thereof to oscillate. Preferably, the bending beam 150 is excited to oscillate at or near its natural frequencies. On the underside of the free end 153, the cantilever 150 has a measuring tip 152. The measuring tip 152, together with the bending beam 150, forms a measuring probe.

The measuring tip 152 can be used by the measuring probe to scan the surface 198 of a sample 190. By way of example, the sample 190 can be a photomask 191. In the example depicted in FIG. 1, the photomask 191 has a substrate 192 and a pattern element 197. The photomask 191 can comprise a transmissive or a reflective mask. Further, the photomask 191 can comprise a stamp for a nanoimprint lithography.

Further, the device 100 can have a third interface 185 via which the programmable logic circuit 120 is provided with the parameter(s) for the control of the z-position of the bending beam 150. The third interface 185 can comprise an ADC 183 if the parameter(s) are provided to the device 100 as analogue signals.

Moreover, the device 100 can comprise a fourth interface 195. The reference variable or the setpoint value w(t) for the control can be supplied to the device 100 or to the programmable logic circuit 120. If the setpoint value of the control is available as an analogue time signal, the fourth interface 195 has an ADC 193 that digitizes the analogue signal of the reference variable.

In the example depicted in FIG. 1, the control loop 180 receives the controlled variable 160 from the optical detection system 172. It is alternatively or additionally possible for the bending beam 150 to have a sensor that measures the controlled variable 160 $y_A(t)$ of the control loop 180 and provides it to the programmable logic circuit 120 of the device 100 via the first interface 105.

Figure 2:
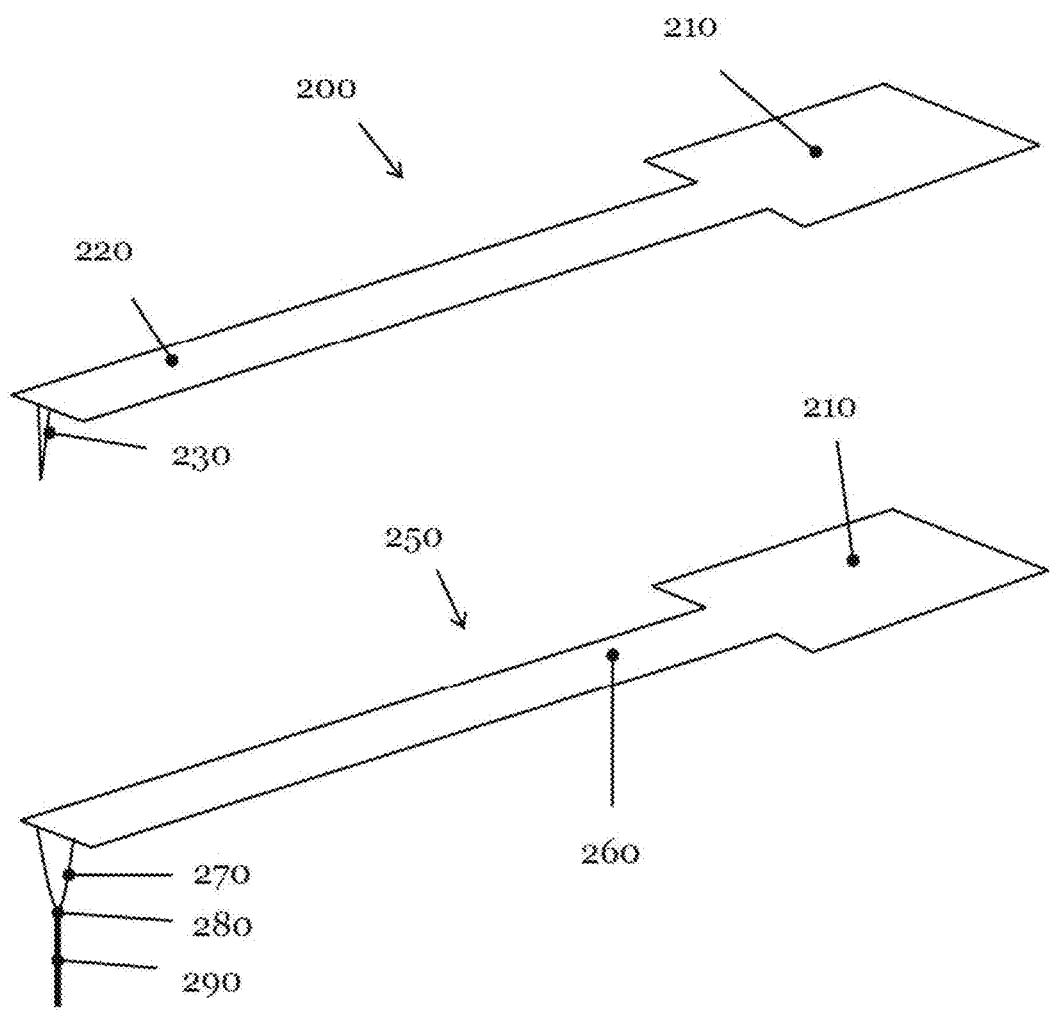
FIG. 2 schematically depicts, in the upper partial image, a measuring probe for examining a sample and, in the lower partial image, a micromanipulator for processing a sample.

The upper partial image in FIG. 2 schematically shows a measuring probe 200 designed to examine a sample, for example the lithographic mask 190 in FIG. 1. The measuring probe 200 comprises a retaining element 210 or a retaining plate 210 that can be used to attach the measuring probe 200 to a measuring head of a scanning probe microscope (not reproduced in FIG. 2). By way of example, the retaining element 210 of the measuring probe 200 can be fixed to the piezo element 155 in FIG. 1. The free end of the cantilever 220 of the measuring probe carries a measuring tip 230 that can be used to scan the photomask 190. The measuring probe 200 can be used in one of the operating modes outlined above. In line with its intended use, the bending beam 220 of the measuring probe 200 has a low elastic constant in the region of 100 N/m, which means that just a small interaction of the measuring tip 230 can be detected by the detection system 172.

The lower partial image in FIG. 2 schematically presents a micromanipulator 250 or a nanomanipulator 250. The micromanipulator 250 is of similar design to the measuring probe 200. However, the micromanipulator 250 has two substantial differences over the measuring probe 200. First, the elastic constant of the bending beam 260 or of the cantilever 260 of the micromanipulator 250 is much higher than that of the measuring probe 200. The micromanipulator 250 can therefore transmit larger forces to a sample 190, for example the photomask 191, than the measuring probe 200. Secondly, the tip 280 of the measuring tip 270 of the cantilever 260 has a long thin acicular tip 290, called a "whisker" in the field of the art. The acicular tip 290 can be used by the micromanipulator 250 for example to pick up a particle from the surface 198 of the photomask 191.

Figure 3:
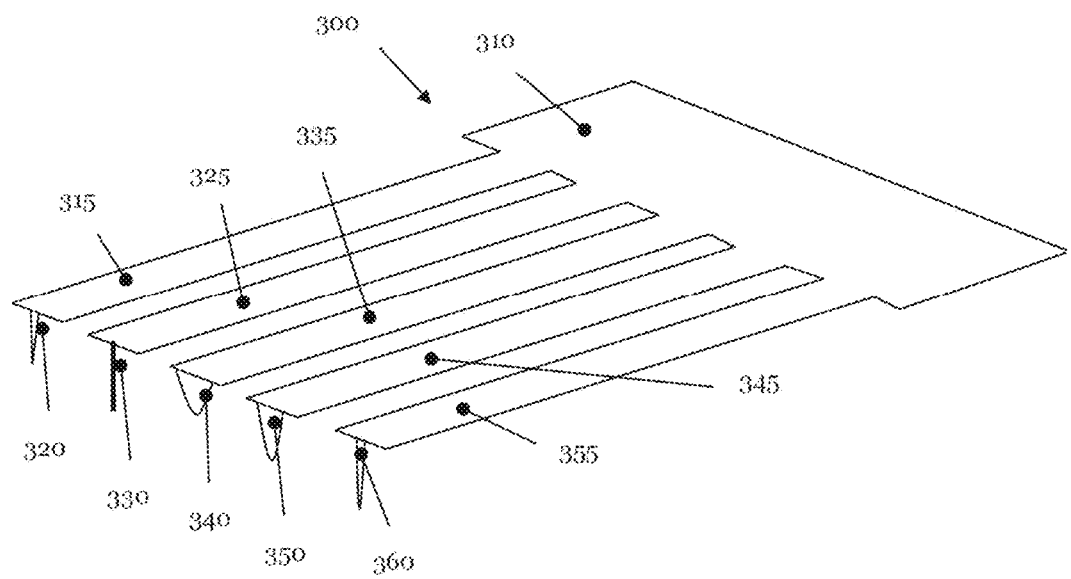
FIG. 3 schematically reproduces a probe arrangement that has measuring probes for examining a sample and probes or micromanipulators for processing a sample.

FIG. 3 schematically presents a probe arrangement 300 that has five probes. As already outlined in FIG. 2, the probe arrangement 300 has a retaining element 310 for attaching the probe arrangement 300 to a measuring head of a scanning probe microscope (not shown in FIG. 3). The illustrative probe arrangement 300 in FIG. 3 comprises two soft cantilevers 315 and 325 that have different measuring tips 320 and 330. These two probes of the probe arrangement 300 are designed to examine a sample by scanning it in one of the operating modes outlined above. The cantilevers or bending beams 335, 345, 355 of the probe arrangement 300 have a high elastic constant in comparison with the cantilevers 315 and 325. Further, the measuring tips 340, 350, 360 of the cantilevers 335, 345, 355 have different forms that are intended to process the sample by use of mechanical contact therewith, for example by abrading material from the surface of the sample. The individual specific probes of the probe arrangement 300 can therefore be used in sequential order both to analyze a sample and to process the sample 190, for example without having to exchange the measuring probe 200 for a micromanipulator 250.

Figure 4:
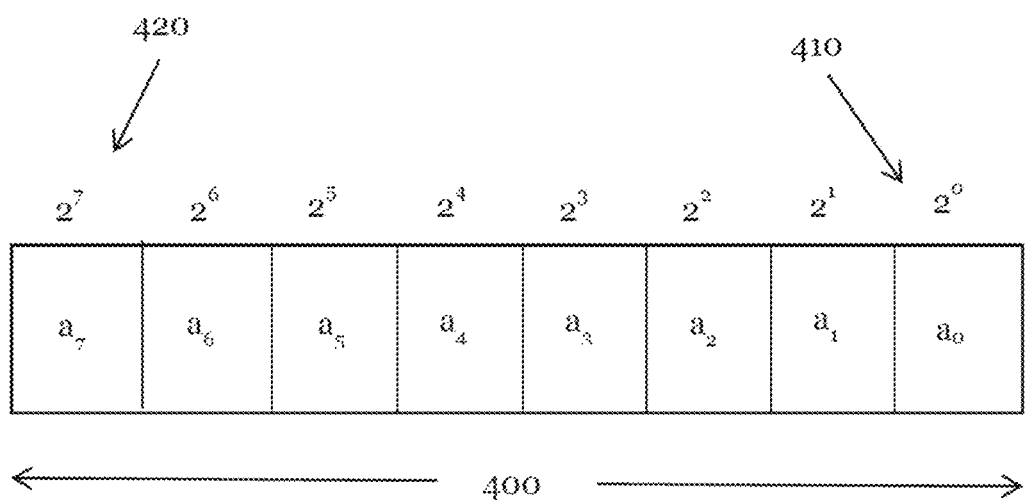
FIG. 4 presents an example of a digital representation of an integer>0 along with the associated bit depth.

FIG. 4 shows the numerical representation using the binary system, i.e. a base-two arithmetic system. With this representation of a digit Z in the form $Z=a_n \cdot 2^n + a_{n-1} \cdot 2^{n-1} + \ldots + a_1 \cdot 2^1 + a_0 \cdot 2_0$ the coefficients $a_0$ to $a_n$ can only assume the values 0 and 1. In the example in FIG. 4, the binary number has a bit depth 400 of 8 bits. The least significant bit 410 (LSB) is on the far right in the binary representation and the most significant bit 420 (MSB) is the bit on the far left. The number of bits, i.e. the bit depth 400, is also referred to as bit width or resolution. The bit depth 400 determines the largest number that can be represented in a binary system in an integer representation. At a bit depth of 8, these are the unsigned integers 0 to 255 and signed integers in the range from −128 to 127, for example.

Figure 5:
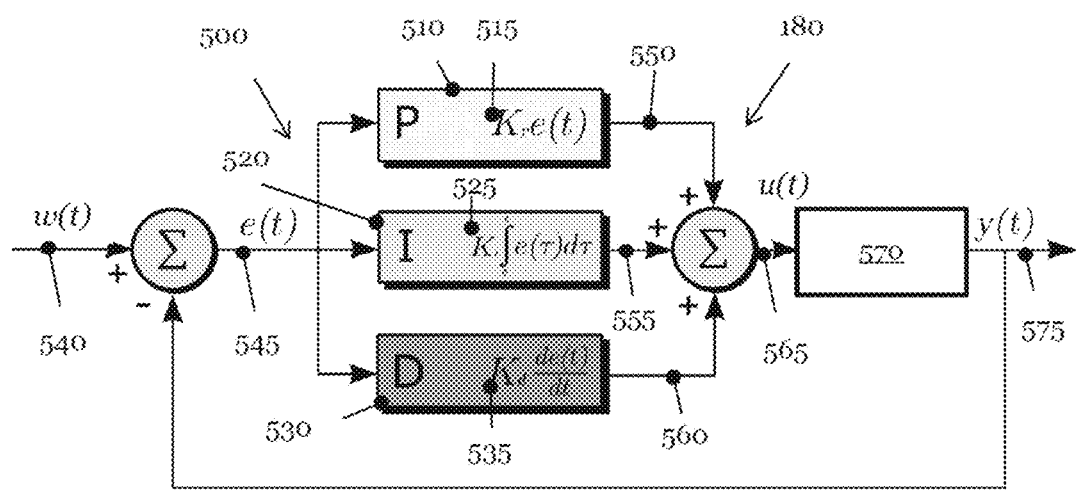
FIG. 5 schematically illustrates a parallel architecture of a PID controller.

FIG. 5 reproduces a schematic block diagram of a control loop 180 operated by a PID controller 500. The PID controller 500 comprises a P (proportional) controller 510, an I (integral) controller 520 and a D (derivative) controller 530 connected in parallel. Connecting the P, I and D terms of the PID controller 500 in series is likewise possible (not shown in FIG. 5).

Of critical importance for interference-free operation of a PID controller 500 is the addition of the output signals 550, 555, 560 of the individual controllers 510, 520, 530. If the PID controller 500 is realized using analogue circuitry, parallel connection of the P, I and D controllers 510, 520, 530 is typically chosen if an electrical current signal is used as controlled variable 575 and manipulated variable 565. If, on the other hand, the control loop 180 is operated using an electrical voltage signal, series connection of the controllers 510, 520, 530 is advantageous.

The reference variable 540 or the setpoint value 540 w(t) is predefined for the PID controller 500 externally. In the example in FIG. 1, this can be the temporal characteristic of the distance of the measuring tip 152 of the bending beam 150 from the surface 198 of a sample 190, for example a photomask 191. As already explained above, the distance of the measuring tip 152 of the bending beam 150 is normally determined by ascertaining the curvature, bend or deflection of the free end 152 thereof. As likewise already discussed within the context of FIG. 1, the controlled variable 575 measured by the detection system 172 or the actual value 575 y(t) is fed back to the input of the controller 500 and deducted from the reference variable 540 or the setpoint value 540. The control error 545 e(t)=w(t)−y(t) determined as a result is supplied to the individual terms 510, 520, 530 of the PID controller 500.

The P term 510 of the PID controller 500 reacts with a sudden gain for the control error 545 or for the error signal 545 according to the relationship: $u(t)=K_P \cdot e(t)$ with the gain factor 515 $K_P$. This response is illustrated in the upper partial image 610 in FIG. 6. Partial image 610 in FIG. 6 reproduces an ideal output of the manipulated variable 565 of a P controller 510. An implementation of the P term 510 using real components leads to one or more overshooting transients of the manipulated variable 565 u(t) before the gain of the P term 510 assumes the value predefined by the gain factor 515 $K_P$ (not shown in partial image 610 in FIG. 6). The reaction of the measuring tip 152 of the bending beam 150 to an abrupt change in the manipulated variable 565 y(t) is therefore impossible to control or can be controlled only with very great difficulty.

If a controller 140 for operating a closed control loop 180 is implemented according to the invention in the form of a programmable logic circuit, the control is therefore always started with a tiny portion of the P term 510 in order to avoid a brief uncontrollable state for the free end 153 of the bending beam 150 and hence for the measuring tip 152 of the bending beam 150. In particular, before the operating mode of the bending beam 150 is switched over, the gain factor 515 $K_P$ is set to zero.

Figure 6:
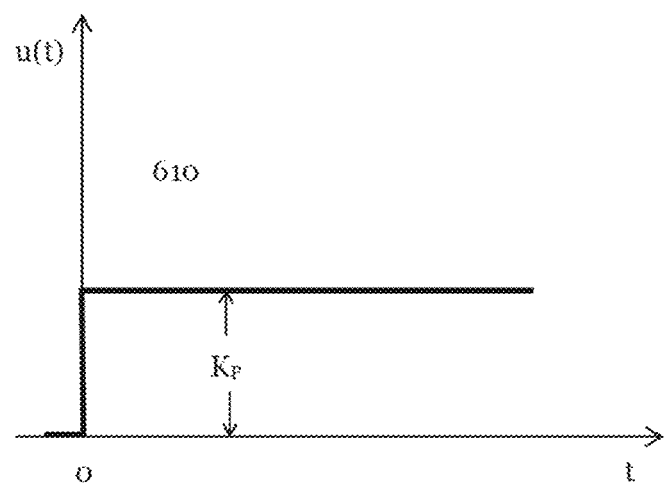
FIG. 6 schematically reproduces, in the upper partial image, the manipulated variable of a P term of a PID controller and illustrates, in the lower partial image, the manipulated variable of an I term of a PID controller for the example of a constant, positive control error.
Figure 6:
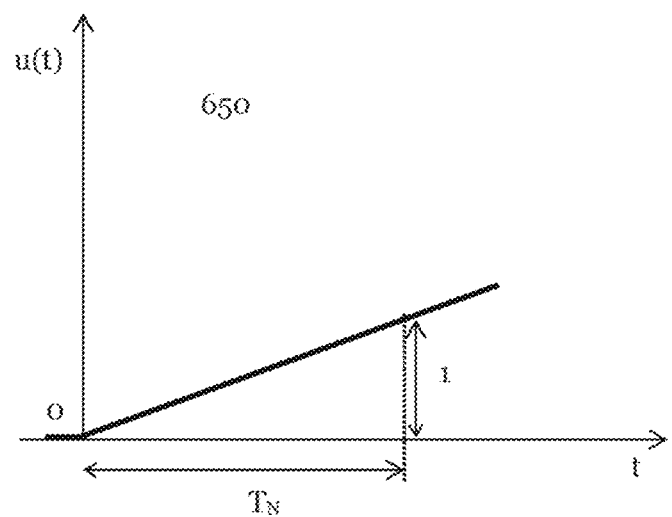

The I term 520 of the PID controller 500 affects the manipulated variable 565 by integrating the control error 545 or the error signal 545 with respect to time:

$$u(t) = \frac{1}{T_N} \int_0^t e(\tau)d\tau,$$

the gain factor 525 $K_I$ being determined by the reset time $T_N$: $K_I = 1/T_N$. A control error that is constant over time 545 e(t)=C leads to a linear rise in the manipulated variable 565: $u(t)=u_i(t)+K_I \cdot C \cdot t$ starting from an initial value of the manipulated variable $u_i(t)$. Lower partial image 650 in FIG. 6 illustrates the temporal characteristic of the manipulated variable 565 for an I term 520 for the conditions: e(t)=C and $u_i(t)=0$.

In an implementation, according to the invention, of a controller 140 using a programmable logic circuit 120, the control is frozen before switching over between two operating modes of the bending beam 150. This means that the manipulated variable 170, 565 u(t) is held at the last numerical value: $u(t)=u(t_0)$. This state is reached by setting the control error or the error signal 545 to zero at the time $t_0$: $e(t_0)=0$. This allows the manipulated variable 565 of the I term 520 of the PID controller 500 to be reliably prevented from producing a switching transient that results in an uncontrolled movement of the measuring tip 152 of the bending beam 150.

The D term 530 of the PID controller 500 forms a derivative-action element:

$$u(t) = T_V \cdot \frac{d}{dt} e(t),$$

the derivative-action time $T_V$ corresponding to the gain $K_D$ 535 or the derivative-action coefficient $K_D$ 535. The D term 530 reacts not to the magnitude of the control error 545 but rather only to the rate of change thereof. The derivative action means that the D term 530 of the PID controller 500 has the property of converting fast changes in the control error 545 into even faster changes in the manipulated variable 565 for the control loop 180.

It is a key point of the device 100 described in this application that said device allows different operating modes of the bending beam 150 to be safely switched over under all circumstances. In particular, this is also meant to apply under the condition that the measuring tip 152 of the bending beam 150 is in the region of interaction with the sample 190. A controller 140 described in this application therefore preferably dispenses with the implementation of a D term 530. Rather, the controller 140 realizes a PI controller having the properties described above. For the reasons outlined above, it is beneficial if the I term 520 of the PI controller dominates or determines the control response thereof.

Figure 7:
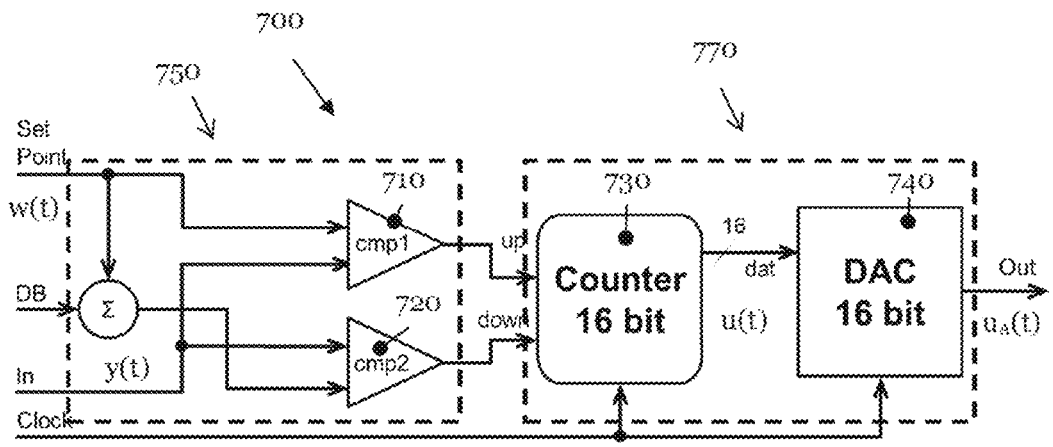
FIG. 7 schematically illustrates a first exemplary embodiment of the implementation of an integral component of a PID controller or an I controller in a hybrid analogue and digital design or architecture.

FIG. 7 illustrates an example of the realization of an I controller 700 or an I term 700 in a hybrid circuit that has an analogue portion 750 and a digital portion 770. The I term 520 comprises the essential components of two comparators 710 and 720 in the analogue circuit part 750 and a counter 730 and a digital-to-analogue converter (DAC) 740 in the digital circuit part 770. The counter 730 can be regarded as an integrator that changes, i.e. increases or reduces, its content by one unit within a time interval or does not change its content.

The comparators 710 and 720 are analogue components in the example depicted in FIG. 7. The setpoint value w(t) and the actual value y(t) can therefore be supplied to the comparators 719, 720 of the hybrid circuit as analogue signals. This implementation therefore requires no analogue-to-digital converter (ADC) for the signals w(t) and y(t).

The two comparators 710 and 720 have threshold values that are separated from one another by a dead band DB. If the difference between the setpoint value w(t) and the actual value, i.e. the control error e(t), is within the dead band, the outputs of the comparators 710 and 720 do not change. The comparator 710 increases the content of the counter 730 by one unit within a clock cycle if the difference between the reference variable or the setpoint value w(t) and the controlled variable or the actual value y(t) is greater than the interval of the dead band. If the difference between the actual value y(t) and the setpoint value w(t) is less than the interval of the dead band, on the other hand, the comparator 720 prompts a reduction in the content of the counter 730 by one unit within the clock cycle.

Since the content of the counter 730 changes by no more than one unit within a clock cycle, the I term 700 in FIG. 7 operates without transients in any operating state. Moreover, the I term 700 only requires a digital-to-analogue converter (DAC) 740. In the example in FIG. 7, the counter 730 and the DAC 740 each have a bit depth of 16 bits. It is naturally also possible to design the I term 700 for other bit depths. The configuration indicated in FIG. 7 has disadvantages with large control errors e(t), however. In these cases too, the I term 700 reacts only by changing the manipulated variable u(t) by one unit within a clock cycle.

Figure 8:
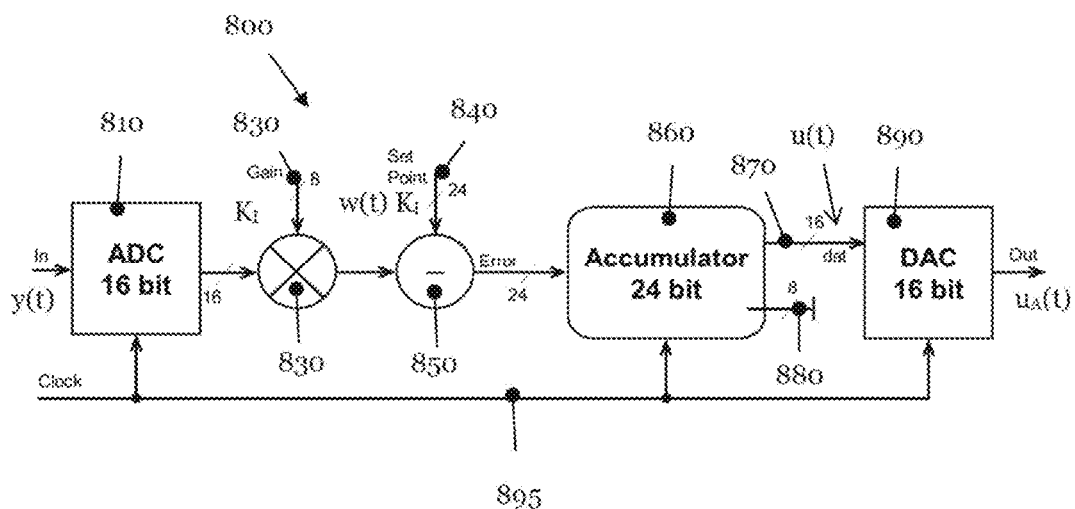
FIG. 8 schematically reproduces a second exemplary embodiment of the implementation of an integral component of a PID controller, which involves a control error being processed using a bit depth that is greater than the bit depth used to represent the controlled variable.

FIG. 8 presents a fully digital implementation of an I term 800 or an I controller 800 in a programmable logic circuit 120 of the device 100. In the example depicted in FIG. 8, the analogue-to-digital converter (ADC) 810 for the controlled variable y(t) and the digital-to-analogue converter (DAC) 890 for the manipulated variable u(t) each have a bit depth of 16 bits. This bit depth is merely illustrative and is not imperative for a design, according to the invention, of a device 100 for operating a control loop 180. Further, it is not necessary for the ADC 810 to have the same bit depth as the DAC 890. Further, it is not necessary for the controlled variable y(t) and/or the manipulated variable u(t) to have a bit depth in the form of a power $2^n$. Rather, the programmable logic circuit 120 can be used to realize any bit depth for the controlled variable and/or the manipulated variable.

In the illustrative realization of the I controller 800 that is depicted in FIG. 8, the determination of the control error e(t) and the multiplication of the control error or the error signal e(t) are transposed in comparison with the block diagram of the controller 500 in FIG. 5. In the example in FIG. 8, the digitized controlled variable y(t), which has a bit depth of 16 bits, is multiplied by the gain factor $K_1$ or the reset time IN of the I term 800. In the example discussed, the parameter 830 $K_1$ has a bit depth or a bit width of 8 bits. The product of both numbers $K_1 \cdot y(t)$ has a bit depth of 24 bits. This corresponds to the sum of the bit depths of the two factors. This phenomenon is referred to in the English-language literature as "bit growth."

The reference variable or the setpoint value w(t) supplied to the subtraction unit 850—in order to compensate for the transposition of multiplication and subtraction in the example in FIG. 8—is likewise multiplied by the gain factor $K_1$, as a result of which the bit depth of this input signal 840 $K_1 \cdot w(t)$ is increased from 16 bits to 24 bits. The subtraction unit 850 delivers the error difference $K_1 \cdot e(t)$ multiplied by the gain factor Kr with a bit depth of 24 bits. This signal is numerically integrated, i.e. summed as a function of time, in the accumulator 860 in sync with the clock signal 895. The integration unit 860 has a bit depth or a bit width of 24 bits. The accumulator 860 is thus designed to integrate the error signal e(t) or the control error e(t) multiplied by the gain factor $K_1$ 840 without any limitation of one or both factors of the multiplication.

An integral term 800 designed according to the present application thus gets around the limitations that an accumulator 860 of the processor of the programmable logic circuit 120 with a 16-bit limit, i.e. a register with a 16-bit limit, has. Rather, the I controller 800 in FIG. 8 allows the integration of small control errors e(t) too and hence highly precise ascertainment of a manipulated variable 870 u(t).

When using a 24-bit-width or -depth DAC it is possible to provide the manipulated variable 870 to the piezo element 155 for the purpose of moving the bending beam 150 as an analogue signal $u_A(t)$ without any approximation. This embodiment is not depicted in FIG. 8. Rather, in FIG. 8 the 24-bit-depth signal of the accumulator 860 is reduced to a 16-bit-width or -depth manipulated variable 870 by cutting the 8 least significant bits. The manipulated variable 870 u(t) with the 16 most significant bits of the accumulator 860 is supplied to the DAC 890, which converts this signal into an analogue manipulated variable signal $u_A(t)$. The output signal of the accumulator 860, which signal provides the manipulated variable of the control loop 180, can be reduced as necessary to a bit depth that is between the bit depth of the accumulator 860 and the bit width of the ADC 810. If the demands on the precision of the control loop are not especially high, the analogue manipulated variable signal can be generated by using a DAC whose bit depth is less than the bit depth of the ADC 810.

Figure 9:
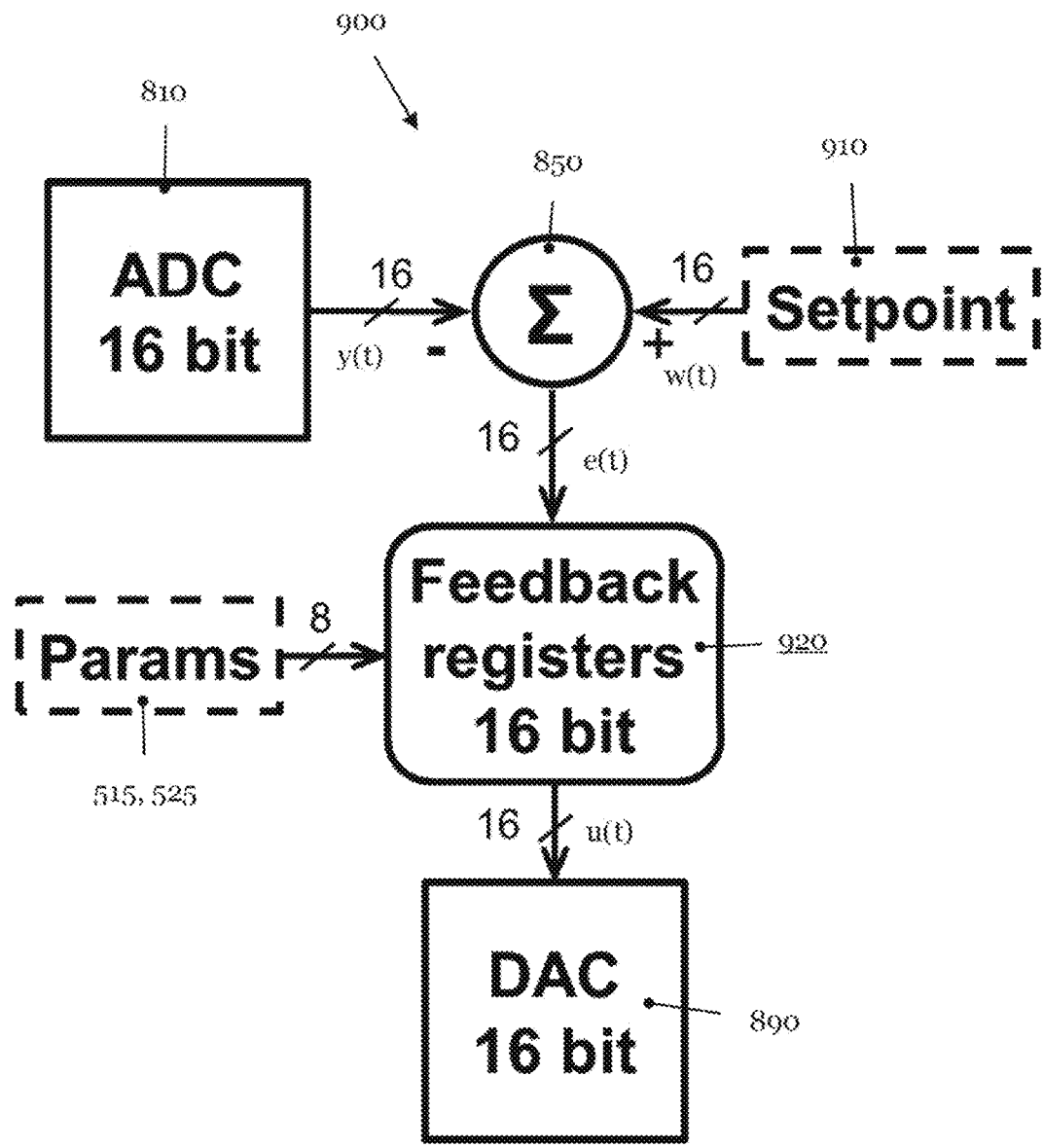
FIG. 9 schematically presents a realization of a PID controller in accordance with the prior art.

FIG. 9 shows the design 900 of a PID controller 500 in a programmable logic circuit 120 of a device 100 according to the prior art. Said PID controller is outlined on the basis of 16-bit-depth digital signals. This means that the ADC 810 and the DAC 890 each have a bit depth of 16 bits. This circumstance is symbolized in FIG. 9 by the number 16 indicated both at the input and at the output. As already explained above, the actual value or the digitized controlled variable y(t) is subtracted from the setpoint value or the digitized reference variable w(t) by the unit 850. The control error e(t) thus produced is supplied to one or more terms 510, 520, 530 of the PID controller 500. The term or the various terms 510, 520, 530 of the PID controller 500 are symbolized in FIG. 9 by feedback registers 920. In the feedback registers 920, the 16-bit-width control error e(t) is multiplied by the 8-bit-width parameters or gain factors $K_P$ 515 and $K_1$ 525 of the proportional component 510 and the integral component 520 of the PID controller 500. In order to prevent the 16-bit-width feedback registers 920 from overflowing as a result of the multiplication, the permissible ranges of values for the control error e(t) and/or the parameters $K_P$ 515 and $K_1$ 525 need to be limited. This drastically restricts the precision for the determination of the manipulated variable u(t) for the control loop 180 from the control error e(t).

Figure 10:
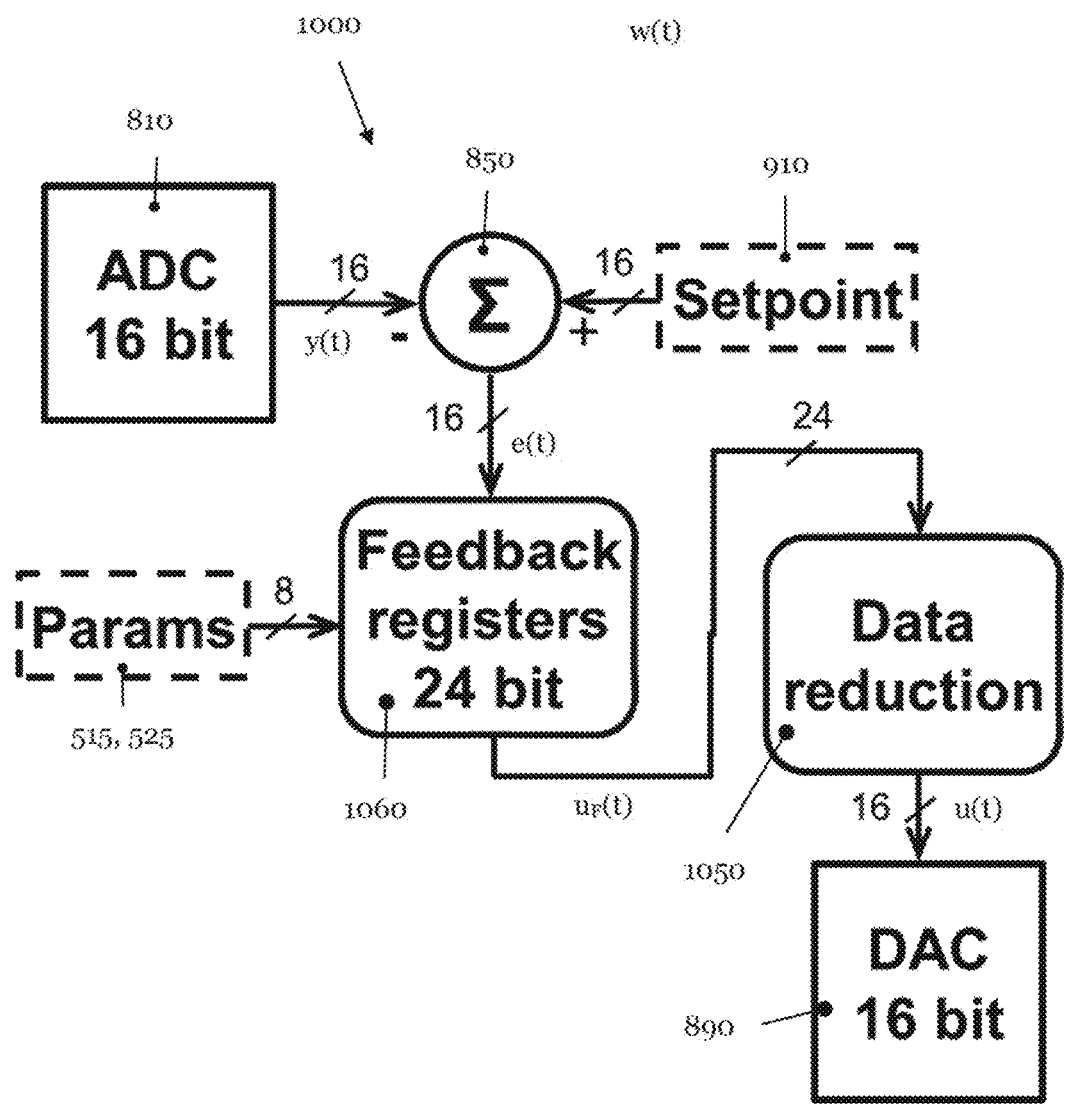
FIG. 10 schematically depicts a design of a PI controller according to the invention.

FIG. 10 indicates an implementation 1000 of a PI controller in a programmable logic circuit 120 that avoids the restrictions discussed above. In the design 1000 presented in FIG. 10, the feedback registers 1060 have a bit depth of 24 bits. The product of the control error e(t) and the parameters 515, 525 or gain factors $K_P$ and $K_1$ can be processed without restriction. Only at the end of the processing process is the digitized manipulated variable $u_F(t)$ reduced from a 24-bit representation to a bit depth of 16 bits. The data reduction takes place in the data reduction unit 1050 in a systematic manner by eliminating the least significant bits (LSBs). So that the PI controller in FIG. 10 can react quickly in spite of the data reduction performed, it is advantageous to use an ADC 810 whose sampling rate is significantly higher than the conversion rate of the DAC 890. The difference in the clock rates of the ADC 810 and the DAC 890 could for example be a factor of 128, for example 2.56 MHz for the ADC 890 and 20 kHz for the DAC 890.

FIG. 11 reproduces a table summarizing simulation results for the I controller 800 in FIG. 8. The first column summarizes various values of the reference variable or of the setpoint values that are predefined for the I controller 800. The numerical range of this variable extends from 1 to 32 767, the largest signed 16-bit number. The second column reproduces the values set for the parameter 525 $K_1$. These have the two extreme values, namely the smallest numerical value in the top four rows and the largest numerical value in the bottom two rows of the table. The third column summarizes the values of the control error e(t). The numerical values for the control error likewise cover the complete range of values that can be represented with a bit depth of 16 bits.

The fourth column and the sixth column reproduce the content of the accumulator 860 after 128 and 256 clock cycles, respectively. The fifth and the seventh column reproduce the manipulated variable u(t) reduced to 16 bits, the 8 least significant bits having been deleted. The table in FIG. 11 reveals that the accumulator 860 can handle the enormous numerical values produced by the multiplication of e(t) and $K_1$ and said numerical values lead to a smooth trouble-free signal characteristic at the output of the I controller 800. An exception is formed only by the extreme situation of maximum control error e(t) while the value of the parameter $K_1$ 525 is simultaneously at a maximum. An overflow in the accumulator 860 occurs only at extreme values of the control error and after 256 clock cycles. The I controller 800 should correct the extreme values of the control error e(t) promptly, however, before they lead to the accumulator 860 overflowing after 256 clock cycles.

Figure 12:
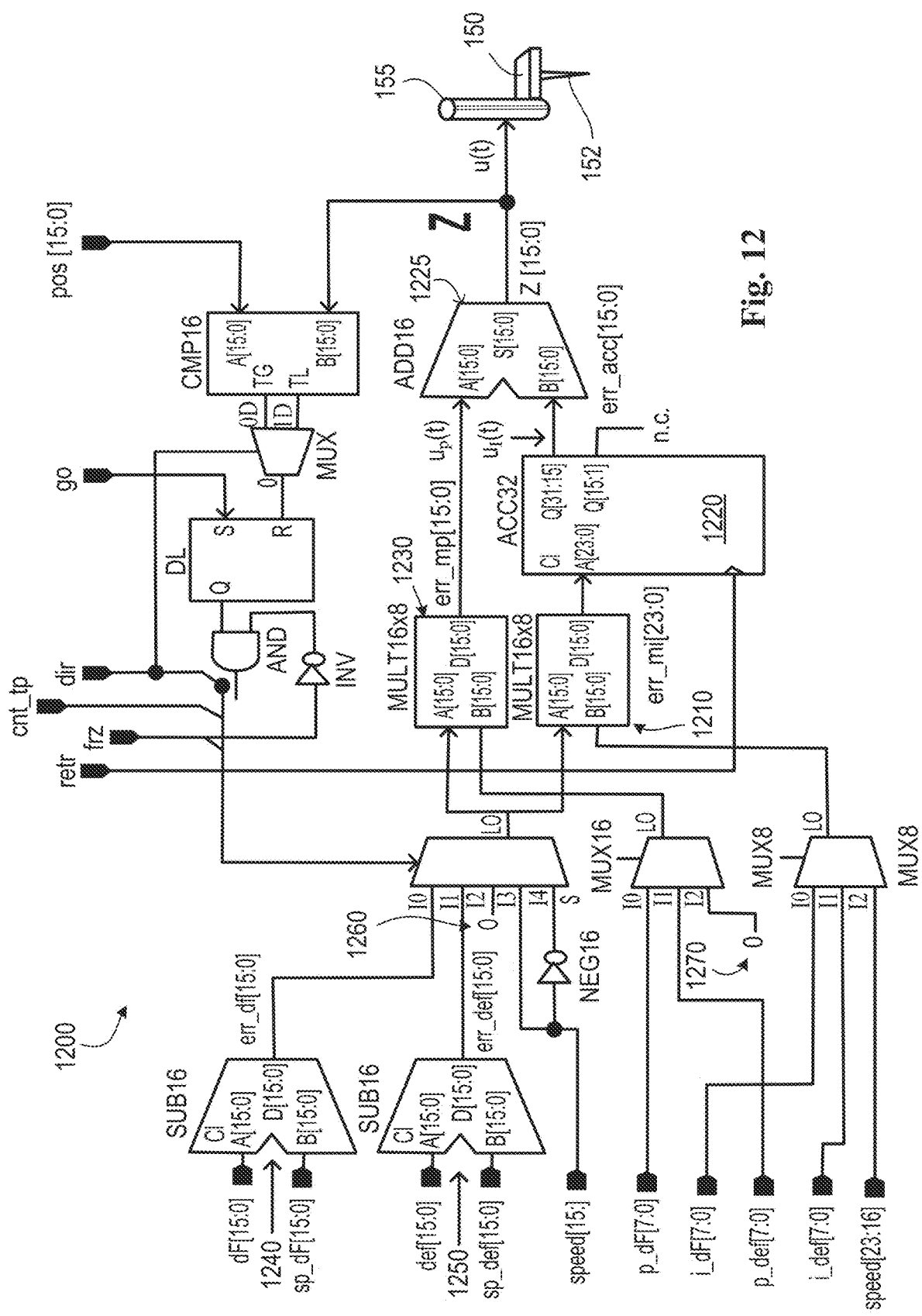
FIG. 12 schematically depicts a diagram of a PI controller at a register transfer level.

FIG. 12 shows a schematic diagram of a PI controller 1200 at register transfer level (RTL). To realize the I term 800 described with reference to FIG. 8, the PI controller 1200 contains the multiplier 1210, which can multiply the control error e(t), which is available in a 16-bit representation, by the parameter $K_1$ 525 of the controller, which has a bit depth of 8 bits, without restriction. The 24-bit-width or -depth product is integrated by the 32-bit-width accumulator 1220. The accumulator 1220 forwards the 16 most significant bits to the adder 1225 as a manipulated variable of the integral term $u_1(t)$. The 16 least significant bits are rejected by the accumulator 1220.

Besides an integral term 1210, 1220, the PI controller 1200 in FIG. 12 also contains a proportional component. For this, the PI controller 1200 has the multiplier 1230. The problems surrounding a proportional component, in particular in respect of switching over the operating mode of the bending beam 150, have already been discussed in detail above within the context of FIG. 5. For the reasons indicated, the integral component 1210, 1220 in the PI controller 1200 is supposed to determine the control response thereof. In the PI controller in FIG. 12, therefore, the multiplier 1230 is produced just with a bit depth of 16 bits. It is, of course, also possible to produce the proportional branch of the PI controller 1200 in a greater bit depth when required. The manipulated variable of the proportional component $u_P(t)$ and of the integral term $u_1(t)$ are combined by the adder 1225 to produce the manipulated variable u(t).

The controlled variable w(t) used by the PI controller 1200 can be the change in the force acting on the bending beam. This is symbolized by the arrow 1240 in FIG. 12. Alternatively, the PI controller 1200 can use the deflection of the free end 153 of the bending beam 150 as controlled variable y(t) 160. In detail, the amplitude and/or the frequency shift of the oscillating bending beam 150 is typically used as controlled variable 160 in the non-contact mode. FIG. 12 illustrates the use of this variable as controlled variable 160 by use of the arrow 1250.

The arrows 1260 and 1270 indicate that both the gain factor $K_P$ 515 of the proportional component and the gain factor $K_1$ 525 of the integral term can be set to zero in the PI controller 1200 when required. This means that the occurrence of switching transients can be reliably prevented in all operating states of the PI controller 1200.

Finally, FIG. 13 reproduces a flowchart 1300 for a method that can be used to operate at least one bending beam 150 in at least one closed control loop 180. The method begins at 1310. In step 1320, at least one controlled variable 160 of the at least one control loop 180 is received. The controlled variable 160 can be received by a first interface 110 of the device 100.

In the next step 1330, a control error 545 of the at least one control loop 180 is processed using a bit depth 400 that is greater than the bit depth 400 of the controlled variable 160. The control error 545 can be processed using at least one programmable logic circuit 120 of the device 100. A manipulated variable 170 of the at least one control loop 180 is then provided in step 1340. The manipulated variable 170 can be provided using a second interface 130 of the device 100. Finally, the method ends in step 1350.

In some implementations, a computer system can execute a computer program including instructions that cause the computer system to operate at least one bending beam in at least one closed control loop. The computer system can include at least one programmable logic circuit to process a control error and operate the at least one bending beam, one or more data processors for processing data, one or more storage devices for storing data, such as one or more databases, and/or one or more computer programs including instructions that when executed by the computer system causes the computer system to carry out the processes described above. In some implementations, the computer system can include digital electronic circuitry, computer hardware, firmware, software, or any combination of the above. The features related to processing of data can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively and/or additionally, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the computer system can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

In some implementations, the data processing (e.g., calculating the P term, the I term, and/or the D term of the PID controller or the PI controller) described above can be implemented using software for execution on one or more mobile computing devices, one or more local computing devices, one or more remote computing devices, and/or one or more cloud computing servers. For instance, the software forms procedures in one or more computer programs that execute on one or more programmed or programmable computer systems, either in the mobile computing devices, local computing devices, or remote computing systems (which can be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software can be provided on a medium, such as a CD-ROM, DVD-ROM, Blu-ray disc, hard drive, or flash drive, readable by a general or special purpose programmable computer or delivered (encoded in a propagated signal) over a network to the computer where it is executed. The functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

While this specification contains many implementation details, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. An apparatus for operating at least one bending beam in at least one closed control loop, the apparatus comprising:
   a. at least one first interface designed to receive at least one controlled variable of the at least one control loop;
   b. at least one programmable logic circuit designed to process a control error of the at least one control loop using a bit depth that is greater than the bit depth of the controlled variable, the programmable logic circuit further being designed to switch over between at least one first operating mode and at least one second operating mode of the at least one bending beam; and c. at least one second interface designed to provide a manipulated variable of the at least one control loop.

2. The apparatus of claim 1, wherein the at least one first programmable logic circuit is designed to switch over between the at least one first and the at least one second operating mode of the at least one bending beam without losing control over a position of the at least one bending beam.

3. The apparatus of claim 1, wherein the at least one programmable logic circuit is designed to switch over between the at least one first and the at least one second operating mode of the at least one bending beam without occurring one element of the group: a switching transient, a switching spike, or a voltage spike on the manipulated variable.

4. The apparatus of claim 1, wherein the manipulated variable of the at least one control loop has a bit depth that corresponds to the bit depth of the controlled variable of the at least one control loop.

5. The apparatus of claim 1, wherein the at least one programmable logic circuit has a data reduction unit designed to bring the bit depth of the manipulated variable of the at least one control loop in line with the bit depth of the controlled variable of the at least one control loop.

6. The apparatus of claim 5, wherein the data reduction unit is designed to reduce the bit depth of the at least one manipulated variable of the at least one control loop by omitting one least significant bit or by omitting multiple least significant bits.

7. The apparatus of claim 1, further having: at least one third interface designed to input at least one parameter for adjusting the at least one control loop.

8. The apparatus of claim 7, wherein the at least one parameter has a bit depth that is less than or equal to the bit depth of the controlled variable of the at least one control loop.

9. The apparatus of claim 7, wherein the at least one parameter comprises at least one element from the group comprising: a gain of the controller, a reset time of the controller and a derivative-action time of the controller.

10. The apparatus of claim 7, wherein the at least one programmable logic circuit is designed to manipulate the at least one parameter with the control error without previously performing a data reduction.

11. The apparatus of claim 1, wherein the programmable logic circuit is designed to set the manipulated variable of the at least one control loop to a predefined value before switching over the at least one first operating mode of the bending beam to the at least one second operating mode of the bending beam.

12. The apparatus of claim 1, wherein the programmable logic circuit is designed to start a proportional component of the control of the at least one control loop from a value of zero after switching over the at least one first operating mode to the at least one second operating mode.

13. The apparatus of claim 1, wherein the at least one first operating mode and the at least one second operating mode comprise at least two operating modes of the group: a contact mode, a non-contact mode, an intermittent mode, and a step-in mode.

14. The apparatus of claim 1, wherein the at least one bending beam comprises an element of the group: a cantilever having a measuring tip of a scanning probe microscope, a probe arrangement for a scanning probe microscope having at least two probes that have different measuring tips for examining and/or preparing a sample, and at least one micromanipulator for preparing a sample.

15. A scanning probe microscope comprising:
a. at least one bending beam configured to be operated in at least one first and at least one second operating mode, wherein the at least one bending beam comprises at least one measuring tip, and the at least one bending beam is configured to be operated in at least one closed control loop;
b. at least one first interface designed to receive at least one controlled variable of the at least one control loop;
c. at least one programmable logic circuit designed to process a control error of the at least one control loop using a bit depth that is greater than the bit depth of the controlled variable and to switch over between the at least one first operating mode and the at least one second operating mode of the at least one bending beam; and
d. at least one second interface designed to provide a manipulated variable of the at least one control loop.

16. A method for operating at least one bending beam in at least one closed control loop, the method having the steps of:
a. receiving at least one controlled variable of the at least one control loop;
b. using at least one programmable logic circuit to process a control error of the at least one control loop using a bit depth that is greater than the bit depth of the controlled variable and to switch over between at least one first operating mode and at least one second operating mode of the at least one bending beam; and
c. providing a manipulated variable of the at least one control loop.

17. A computer program having instructions stored in a nonvolatile storage medium, wherein the instructions prompt a computer system to perform the steps of the method of claim 16 when executed by the computer system.

* * * * *

UNITED STATES PATENT AND TRADEMARK OFFICE
CERTIFICATE OF CORRECTION

PATENT NO. : 12,405,289 B2
APPLICATION NO. : 18/616453
DATED : September 2, 2025
INVENTOR(S) : Christof Baur and Florian Demski It is certified that error appears in the above-identified patent and that said Letters Patent is hereby corrected as shown below:

In the Specification

Column 13
Line 22, delete "$a_0 \cdot 2_0$" and insert -- $a_0 \cdot 2^0$ --

Column 14
Line 33 (Approx.), delete "$K_1$" and insert -- $K_I$ --
Line 34 (Approx.), delete "$T_N:K_1=$" and insert -- $T_N: K_I=$ --
Line 36 (Approx.), delete "$K_1 \cdot C \cdot t$" and insert -- $K_I \cdot C \cdot t$ --

Column 16
Line 9, delete "$K_1$" and insert -- $K_I$ --
Line 9, delete "$IN$" and insert -- $T_N$ --
Line 11, delete "$K_1$" and insert -- $K_I$ --
Line 12, delete "$K_1 \cdot y(t)$" and insert -- $K_I \cdot y(t)$ --
Line 20, delete "$K_1$" and insert -- $K_I$ --
Line 21, delete "$K_1 \cdot w(t)$" and insert -- $K_I \cdot w(t)$ --
Line 22, delete "$K_1 \cdot e(t)$" and insert -- $K_I \cdot e(t)$ --
Line 23, delete "$Kr$" and insert -- $K_I$ --
Line 29, delete "$K_1$" and insert -- $K_I$ --

Column 17
Line 6, delete "$K_1$" and insert -- $K_I$ --
Line 11, delete "$K_1$" and insert -- $K_I$ --
Line 20, delete "$K_1$" and insert -- $K_I$ --
Line 39, delete "$K_1$" and insert -- $K_I$ --
Line 54, delete "$K_1$" and insert -- $K_I$ --
Line 57, delete "$K_1$" and insert -- $K_I$ --

Signed and Sealed this
Ninth Day of December, 2025

John A. Squires
*Director of the United States Patent and Trademark Office*

Column 18
Line 2, delete "$K_1$" and insert -- $K_I$ --
Line 7, delete "$u_1(t)$" and insert -- $u_I(t)$ --
Line 23, delete "$u_1(t)$" and insert -- $u_I(t)$ --
Line 37, delete "$K_1$" and insert -- $K_I$ --